United States Patent
Cassani et al.

(10) Patent No.: US 8,135,571 B2
(45) Date of Patent: Mar. 13, 2012

(54) VALIDATING MANUFACTURING TEST RULES PERTAINING TO AN ELECTRONIC COMPONENT

(75) Inventors: Carisa Anne Cassani, Durham, NC (US); Robert Glen Gerowitz, Raleigh, NC (US); Michael Patrick Muhlada, Raleigh, NC (US); Chad Everett Winemiller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 12/191,538

(22) Filed: Aug. 14, 2008

(65) Prior Publication Data
US 2010/0042396 A1  Feb. 18, 2010

(51) Int. Cl.
G06G 7/62 (2006.01)
G06F 9/44 (2006.01)
G06F 13/10 (2006.01)
G06F 17/50 (2006.01)

(52) U.S. Cl. ............... 703/13; 703/20; 716/126
(58) Field of Classification Search ............ 703/13, 703/20; 716/51, 54, 111
See application file for complete search history.

(56) References Cited

U.S. PATENT DOCUMENTS

| | | | |
|---|---|---|---|
| 6,457,152 B1 | 9/2002 | Paley et al. | |
| 6,868,513 B1 | 3/2005 | Botala et al. | |
| 6,889,158 B2 | 5/2005 | Penov et al. | |
| 6,980,975 B2 | 12/2005 | Reed et al. | |
| 7,092,902 B2 | 8/2006 | Eldridge et al. | |
| 7,127,691 B2 | 10/2006 | Cruz et al. | |
| 7,454,729 B1 * | 11/2008 | Kanji et al. | 716/113 |
| 7,584,437 B2 * | 9/2009 | Youngman et al. | 716/100 |
| 2003/0115522 A1 * | 6/2003 | Nadeau-Dostie et al. | 714/726 |
| 2003/0145297 A1 | 7/2003 | Cote et al. | |
| 2003/0154465 A1 * | 8/2003 | Bollano et al. | 717/137 |
| 2005/0273737 A1 | 12/2005 | Youngman et al. | |
| 2006/0075315 A1 | 4/2006 | Cruz et al. | |
| 2006/0122817 A1 * | 6/2006 | Baumgartner et al. | 703/14 |

OTHER PUBLICATIONS

"Hierarchical High Level Designer Tester Interface", IBM Technical Disclosure Bulletin, Mar. 1979, pp. 3979-3983.

* cited by examiner

*Primary Examiner* — Dwin M Craig
*Assistant Examiner* — Aniss Chad
(74) *Attorney, Agent, or Firm* — Yee & Associates, P.C.; Daniel H. Schnurmann

(57) ABSTRACT

The invention is directed to validating a specified manufacturing test rule, which pertains to an electronic component. The method includes generating a file of test data sets, wherein each test data set in the file is valid for the rule. Each test data set includes a stimulus comprising one or more single input vectors, and further includes a set of results that are expected. The method further comprises constructing a testbench to prepare testcases for simulation, wherein each testcase corresponds to the stimulus and the expected output results of one of the test data sets, and each testcase is disposed to be simulated separately, or independently, from every other testcase. The method further comprises selectively preparing each of the testcases for simulation, in order to provide simulated results for the stimulus corresponding to each testcase. The expected results and the simulated results are compared for each testcase.

17 Claims, 5 Drawing Sheets

VALIDATING MANUFACTURING TEST RULES PERTAINING TO AN ELECTRONIC COMPONENT

BACKGROUND OF THE INVENTION

1. Field of the Invention

The invention disclosed and claimed herein generally pertains to a method for automatically validating or verifying manufacturing test rules that pertain to integrated circuits or other electronic components. More particularly, the invention is directed to a method of the above type pertaining to rules for components that contain analog and/or custom digital circuits, as well as purely digital logic circuits. Even more particularly, the invention is directed to a method of the above type wherein test cases used in the method each have a stimulus that comprises one or more multiple input vectors.

2. Description of the Related Art

Manufacturing test rules are very necessary in designing integrated circuits, blocks of logic or other electronic components. A manufacturing test rule generally indicates the logical representation of an electronic component from a manufacturing test perspective. This rule describes all possible valid outputs of a component, for each possible pattern or combination of valid inputs, and is needed in order to measure testability. Manufacturing test rules are also needed to determine the locations of any manufacturing defects.

Many manufacturing test rules are created by hand, and are thus very prone to error. Because of this, and also because of the importance of such rules, it is essential to validate their accuracy or correctness. For example, care must be taken to ensure that the test rule representation of a logic block matches the way in which the block actually operates during test mode. This requirement becomes increasingly important in high-speed applications, where a growing number of low-level components are being designed with analog or custom digital logic, in order to enhance speed and functionality. At present, there is no automatic method to create rules for these types of components, so the rules must be created manually. Accordingly, validating the rules for these types of components is of paramount importance. Manufacturing test rules for digital logic blocks, while somewhat easier to generate than manufacturing test rules for analog or custom digital logic, also require validation to ensure their integrity and testability.

Notwithstanding the importance of validating manufacturing test rules, currently available techniques for performing this task are largely manual, and are mainly done in connection with a top-level rule (i.e., a manufacturing test rule for a top-level core, that contains many other manufacturing test rules). Working with a top-level rule may reduce the number of verification environments that must be created. However, with this approach it may be difficult to pinpoint where the failure in a test rule occurs. This approach can also increase both the simulation time, due to the size of the rule, and the state space of the input vectors in the simulator.

BRIEF SUMMARY OF THE INVENTION

The invention is generally directed to a method and apparatus for validating a specified manufacturing test rule, which pertains to an electronic component. One embodiment comprising a method includes the step of generating a file of test data sets, wherein each test data set in the file is valid for the rule. Each test data set includes a stimulus comprising one or more single input vectors, and further includes a set of results that are expected when the stimulus is applied to the electronic component. The method further comprises constructing a testbench to prepare each of a plurality of testcases for simulation, wherein each testcase corresponds to the stimulus and the expected results of one of the test data sets, and each testcase is disposed to be simulated separately, or independently, from every other testcase. The method further comprises selectively preparing each of the testcases for simulation, in order to provide simulated results for the stimulus corresponding to each testcase. The expected results and the simulated results are compared for each testcase, in order to determine whether there are any differences therebetween. Each of the above steps can be carried out using means that are completely automated. Thus, the entire method for validating manufacturing test rules can likewise be completely automated. Also, the processing applied to different test cases can occur simultaneously or in parallel, in order to substantially reduce the processing burden.

DETAILED DESCRIPTION OF THE INVENTION

Figure 1:
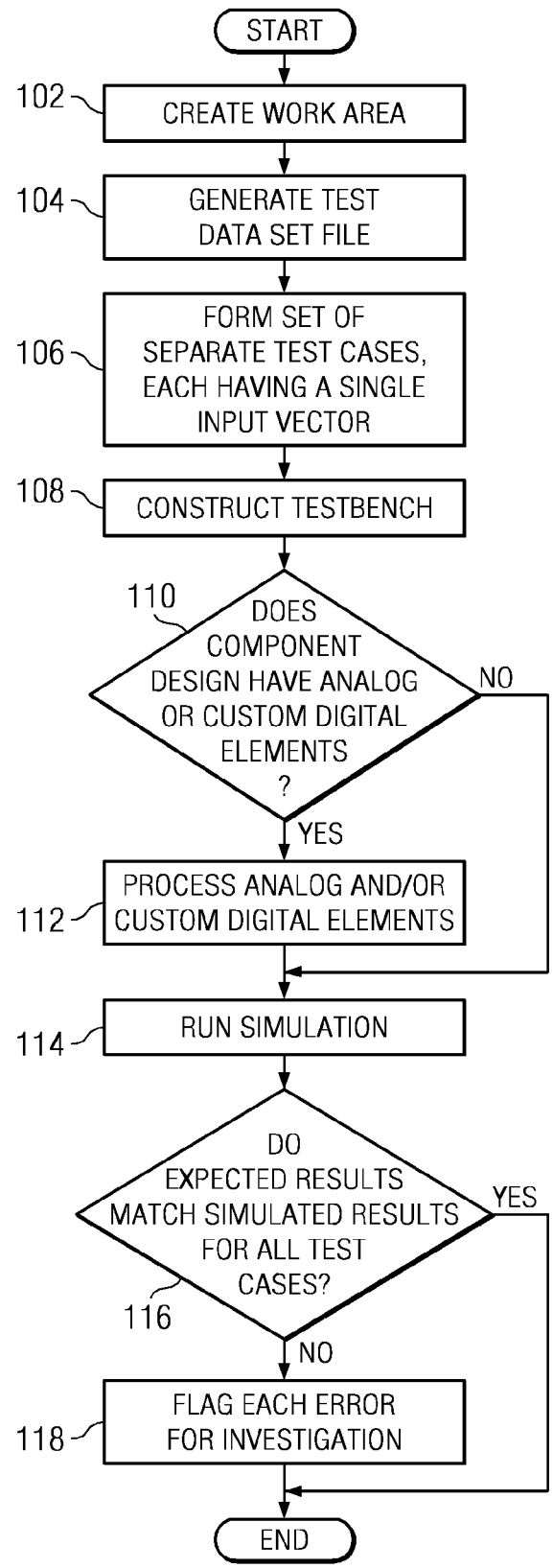
FIG. 1 is a flowchart showing principal steps of a method that comprises an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there are shown principal steps for a method comprising an embodiment of the invention, wherein the embodiment provides complete automation for validating manufacturing test rules. The embodiment also allows the user to automatically create environments around test rules, at any hierarchy level. The embodiment of FIG. 1 is intended to validate manufacturing test rules for electronic components such as a leaf cell of the type shown in FIG. 2. This leaf cell has six inputs and only one output, for the purpose of illustration. Herein, the design or schematic of an electronic component associated with a test rule is referred to as the "base design" of the component.

Figure 2:
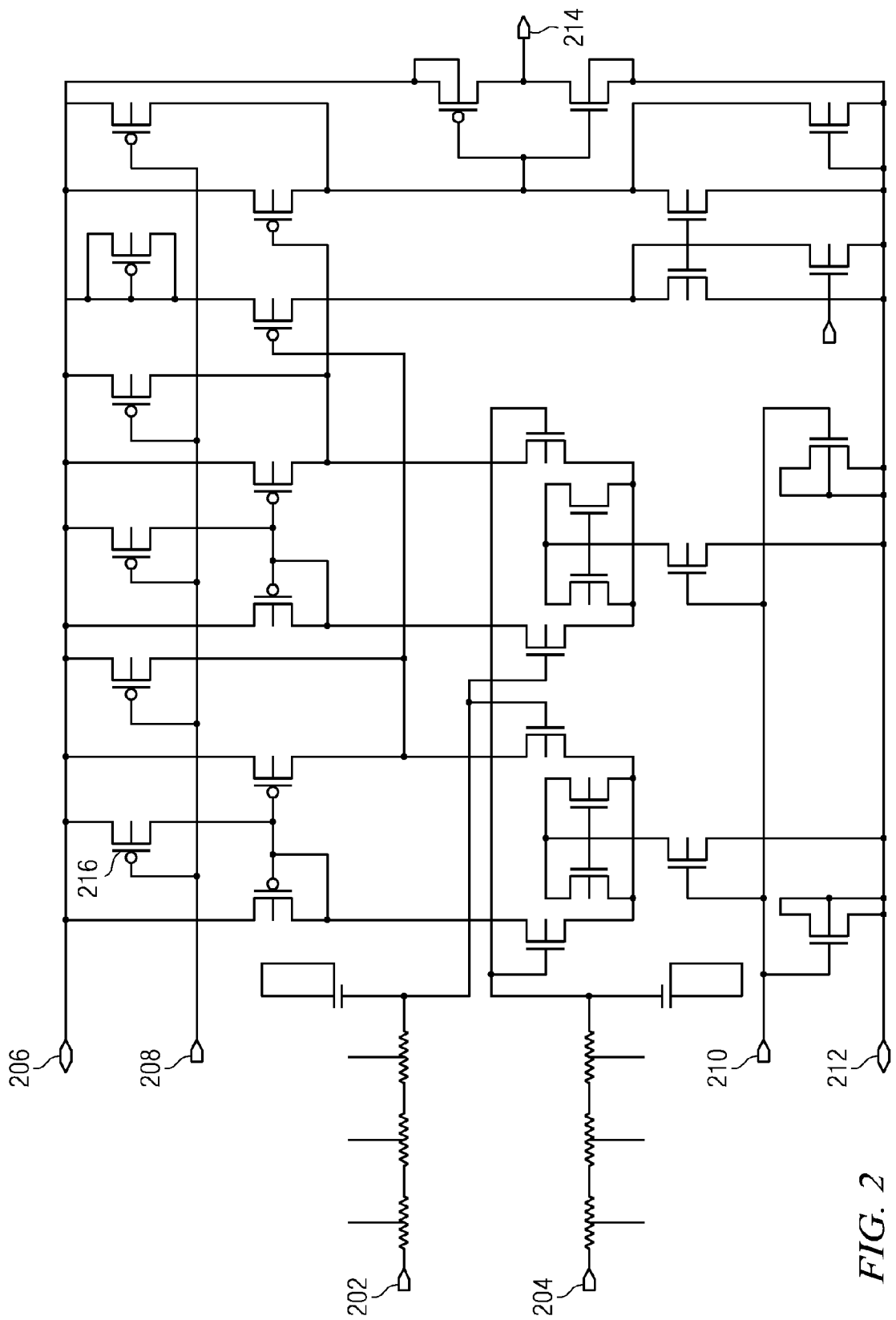
FIG. 2 is a schematic diagram showing an electronic component with which the embodiment of FIG. 1 may be used.

The leaf cell of FIG. 2 is a low-level component that comprises digital logic, which can be built up into a higher level block. Because leaf cells are comparatively small, manufacturing test rules for such circuit components are usually created manually. Thus, it is very important to test these rules for validity. As stated above, a manufacturing test rule generally indicates the logical representation of an electronic component from a manufacturing test perspective. This rule describes all possible valid outputs of a component, for each possible pattern or combination of valid inputs, and is needed in order to measure testability. This rule is also needed to determine the locations of any manufacturing defects. More generally, the test rule is intended to reflect or indicate how the component actually operates during manufacturing test operation. FIG. 2 shows that the leaf cell thereof is provided with six inputs 202-212, and with a single output 214. The leaf cell comprises a number of transistor elements exemplified by transistor 216, which are connected with one another to perform prespecified digital logic operations.

Referring again to FIG. 1, step 102 thereof is directed to creating a work space. That is, at step 102, space is set aside, such as in a computer hard drive memory, for holding the testbench of step 108, described in further detail hereinafter. Space is also created for holding output files that result from simulation at step 114, likewise described hereinafter. Custom scripts are also created at step 102, for use in compiling and running the simulations.

At step 104, a file containing sets of test data is generated, wherein each test data set is valid for a particular manufacturing test rule that is associated with the base design of a component, such as the leaf cell of FIG. 2. Each test data set comprises a stimulus and a corresponding set of expected results. The stimulus for a particular test data set comprises one or more input vectors, or specific patterns of inputs. Thus, when the stimulus of a test data set is applied to the electronic component defined by the leaf cell, the expected results corresponding to the test data set will be observed, if the rule is valid. It is to be understood further that an input vector comprises a set of inputs that are all applied to the designed component at the same time. A stimulus will have multiple input vectors, if it is necessary to apply different input vectors to the component at successive times, in order to have a satisfactory test.

Usefully, respective test data sets are automatically generated at step 104, by using an Automatic Test Pattern Generator (ATPG) tool. An ATPG tool is an electronic design automation tool used to find an input or test sequence that, when applied to a digital circuit, makes it possible to distinguish between correct circuit behavior and faulty circuit behavior caused by a particular fault or error. Thus, the task of step 104 can be performed quickly and efficiently, and without any manual activity.

At step 106, a set of separate testcases are formed from the file of test data sets, wherein each testcase is an intended simulation or implementation of one of the test data sets. Accordingly, a testcase has a single input vector, also referred to as a pattern or combination of inputs, and a set of expected results that corresponds to the single input vector. Each testcase could, for example, comprise a collection or set of specified processor instructions, arranged for execution in a specified order.

It is to be emphasized that two or more of the testcases, and preferably all of them, can be processed separately or independently of one another. Thus, multiple testcases can be simulated simultaneously, such as by parallel processing or by means of a multiprocessor. As a result, the time required to simulate a large number of test data sets or testcases, in order to obtain a set of expected results for each of the corresponding single input vectors, can be substantially reduced.

Step 108 of FIG. 1 is directed to construction of a testbench, which is generally a virtual environment for verifying the correctness of a design. Usefully, the testbench of step 108 is created using a Hardware Description Language (HDL). Examples of HDLs that can be used for the testbench are VHDL or Verilog, but this embodiment does not restrict the testbench to just these two HDLs. As described hereinafter in further detail, the testbench of step 108 operates cooperatively with a simulator of step 114 to receive the input vectors for respective testcases, simulate the application of each input vector to the electronic component, and measure each of the resulting outputs. The measured results for each testcase are then compared with the corresponding expected output results. The testbench is provided with code for reading in each of the single input vectors, and further includes code for carrying out the measuring and comparing steps.

The testbench of step 108 can be used with an electronic component that has a base design comprising gate-level logic. The testbench also provides capabilities that enable it to be used with base designs that include customized digital circuits and/or analog circuits, as described hereinafter in further detail in connection with FIG. 3.

Referring further to FIG. 1, it must be determined whether the base design of the electronic component includes any analog elements or customized digital elements, as shown by step 110. If the component has either of these types of elements, additional processing is required, as indicated by step 112. The processing referred to generally by step 112 is described hereinafter in further detail, in connection with FIG. 3.

Following either step 112 or a negative determination at step 110, the method of FIG. 1 proceeds to step 114. At this step, the simulation of each testcase, as referred to above, takes place to produce the corresponding measured output results. This may be carried out by a mixed mode simulator. As described above, the simulation and other processing required for different testcases can take place simultaneously with one another.

At step 116, the expected results for each testcase are compared with the results obtained by simulation. If the two sets of results match, "pass" is entered in a log file for the testcase. Otherwise, "fail" is entered in the log file for the testcase and the method of FIG. 1 proceeds to step 118. This step flags each failure to match for further investigation. For example, a failure for a particular testcase could indicate to an investigator where an error is to be looked for, in the rule that is being tested.

With increasing frequency, higher speed applications are making use of manually designed core components, based on circuit schematics that use analog devices or custom digital logic. Cores of these types often have special pins for component input or output ports, wherein the pins must be biased by a voltage or current source. Some of the ports may also use current mode logic (CML). In CML, a single output state is indicated by determining the difference between a pair of output ports rather than by the value of an individual one. However, this difference need not and is expected not to be the full voltage rail difference. The simulation procedure carried out at step 114 of FIG. 1 generally requires analog values to be at or near the voltage rails in order to determine their logical value.

The process of step 112 of FIG. 1 is intended to resolve issues such as these, which arise due to component base designs that use either analog circuits or custom digital logic circuits. Usefully, resolution is achieved by creating an analog wrapper file before simulation, wherein the wrapper file instantiates the base design, and can be used with the testbench. In some embodiments, Verilog-AMS (VAMS) could be used as the language to implement the analog wrapper file. Verilog-AMS is a derivative of Verilog, and includes analog and mixed-signal systems (AMS), in order to define the behavior of both types of systems.

Figure 3:
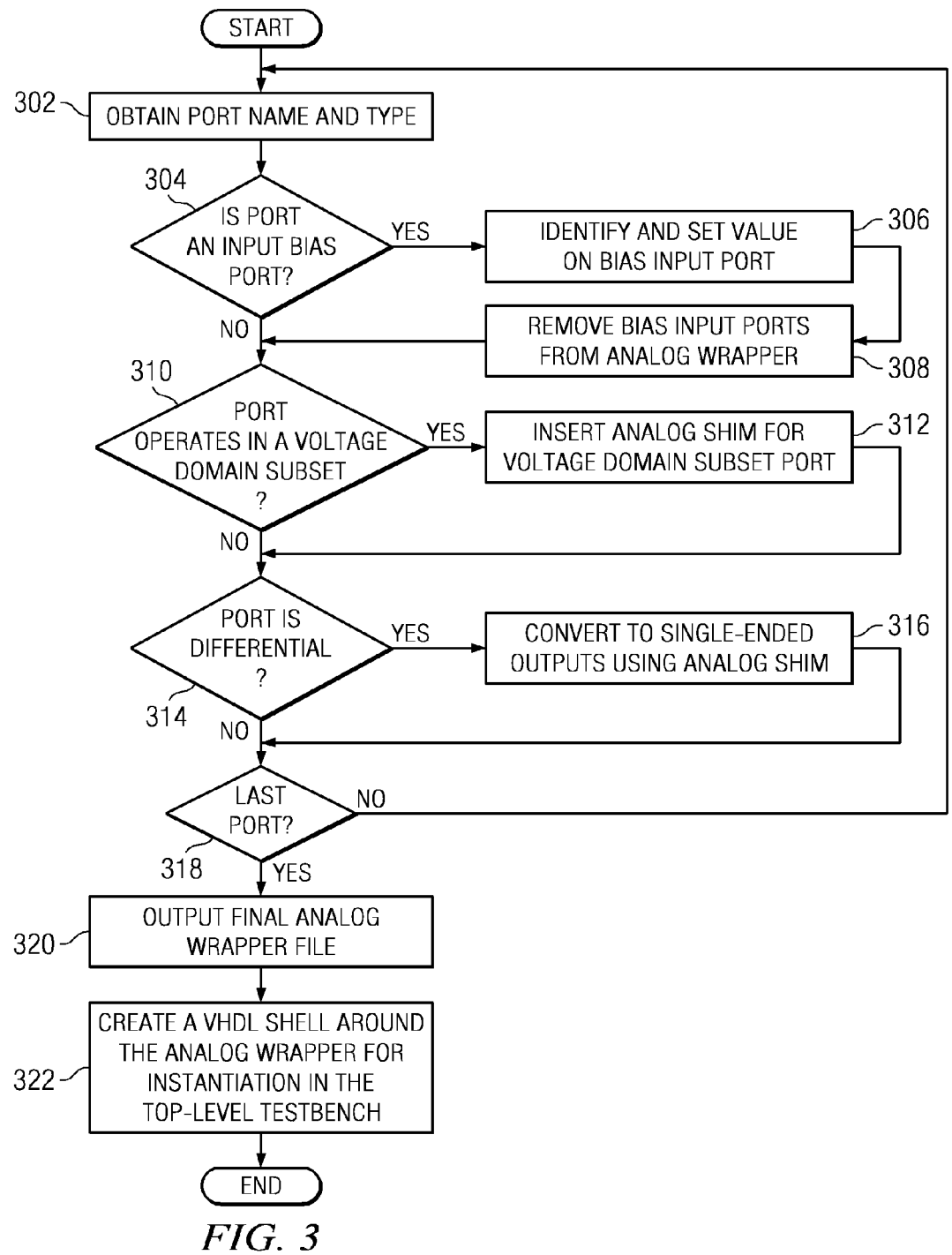
FIG. 3 is a flowchart showing one of the steps of the embodiment of FIG. 1 in further detail.

Referring to FIG. 3, there is shown a number of steps which collectively provide a very effective process for step 112 of FIG. 1. An initial step 302 of the process obtains both the name and the type of one of the ports of the base design. The next step 304 is a decision step, for determining whether the port is an input bias port. If not, the process moves on to decision step 310. Otherwise, the process moves to steps 306 and 308.

At step 306, it is recognized that a port could have a bias that was a non-rail voltage value, and was therefore not compatible with a simulation environment for component designs that were based on purely conventional digital logic. Thus, step 306 is provided, in order to identify the bias value needed for the port. This information may be determined, for example, from the name of the port. That is, a port that has a particular name may have a bias value that is well known, based on a convention that is widely known by those of skill in the art. Alternatively, the voltage bias information may be supplied from a separate file specified by a user. After determining bias value, bias pins are automatically inserted into the analog wrapper file referred to above, and electrically stimulated using voltage and/or current sources.

At step 308, bias pins corresponding to the pins of step 306 are removed from the analog wrapper, since such pins do not need to be stimulated by the testbench of step 108. The process of FIG. 3 then proceeds to decision step 310.

In the base design, associated with the test rule for the electronic component, there may be circuit ports that operate in a full rail to rail voltage domain. For example, for a voltage $V_{DD}$ a port could operate between the $V_{DD}$ value (e.g. 1 volt) and ground. However, another port could operate within a subset of that range (e.g., 0.1-0.6 volts). Accordingly, step 310 is provided, to determine whether a port is characterized by such a voltage domain subset. If not, the process of FIG. 2 moves on to step 314, and otherwise proceeds to step 312.

At step 312, a port that operates in a voltage domain subset as described above is identified, such as by using a naming convention, or by information provided from a user specified file. A custom analog shim is then inserted to convert appropriate digital values from the testbench to match the two endpoints of the voltage domain subset. This is necessary, because mid-range voltages may be converted to "X", or an unknown value, when passing automatically through an electrical to logical connect module. Thus, the upper end point of the subset will always be logic 1, regardless of actual voltage value.

Decision step 314 is provided to query whether a port uses differential CML, as described above. If it does, the process moves on to decision step 316, and otherwise proceeds to step 318. At step 314, use of a differential CML output by a port is detected, once again either by means of a port naming convention, or a user specified file. At Step 316, a custom analog shim is inserted for each differential output pair, to calculate their representative single output value, and to place the full voltage rail difference of this value on the original two ports of the differential CML pair. This is necessary, because the original possible mid-range voltages may be converted to "X", or an unknown value, when passing automatically through an electrical to logical connect module. For example, if two outputs were at 0.7 volts and 0.4 volts, one or both of these may get converted to an 'X', whereas the difference of them would indicate a logical '1' to the system. The analog shim calculates this and places the full voltage rail difference (1 volt and 0 volts in the example above) on the original differential CML output pair.

Referring further to FIG. 3, there is shown decision step 318 for determining whether the most recent port accessed by steps 302-316 was the final port. If not, the process returns to step 302 in connection with the next port, and otherwise the process moves to step 320. At this step, a final analog wrapper file is provided, which contains all of the transformations as described above, for each of the input ports, output ports and bias pins of the base design for the electronic component. Generally, the analog wrapper file automatically performs the tasks of settling bias voltages on appropriate ports of the logic block; wiring up power and ground sources; and creating full voltage rail output values for differential output pairs.

At step 322, a VHDL shell is created around the analog wrapper, wherein this VHDL shell matches the VHDL created in connection with the testbench of step 108. Thus, the VHDL shell of step 322 can be instantiated by the testbench. The wrapper file thus provides a bridge from an analog environment to a digital environment, in cases where the base design includes analog elements. Referring again to FIG. 1, the VHDL shell created at step 322 is used with the testbench in simulations carried out at step 114, as described above.

Figure 4:
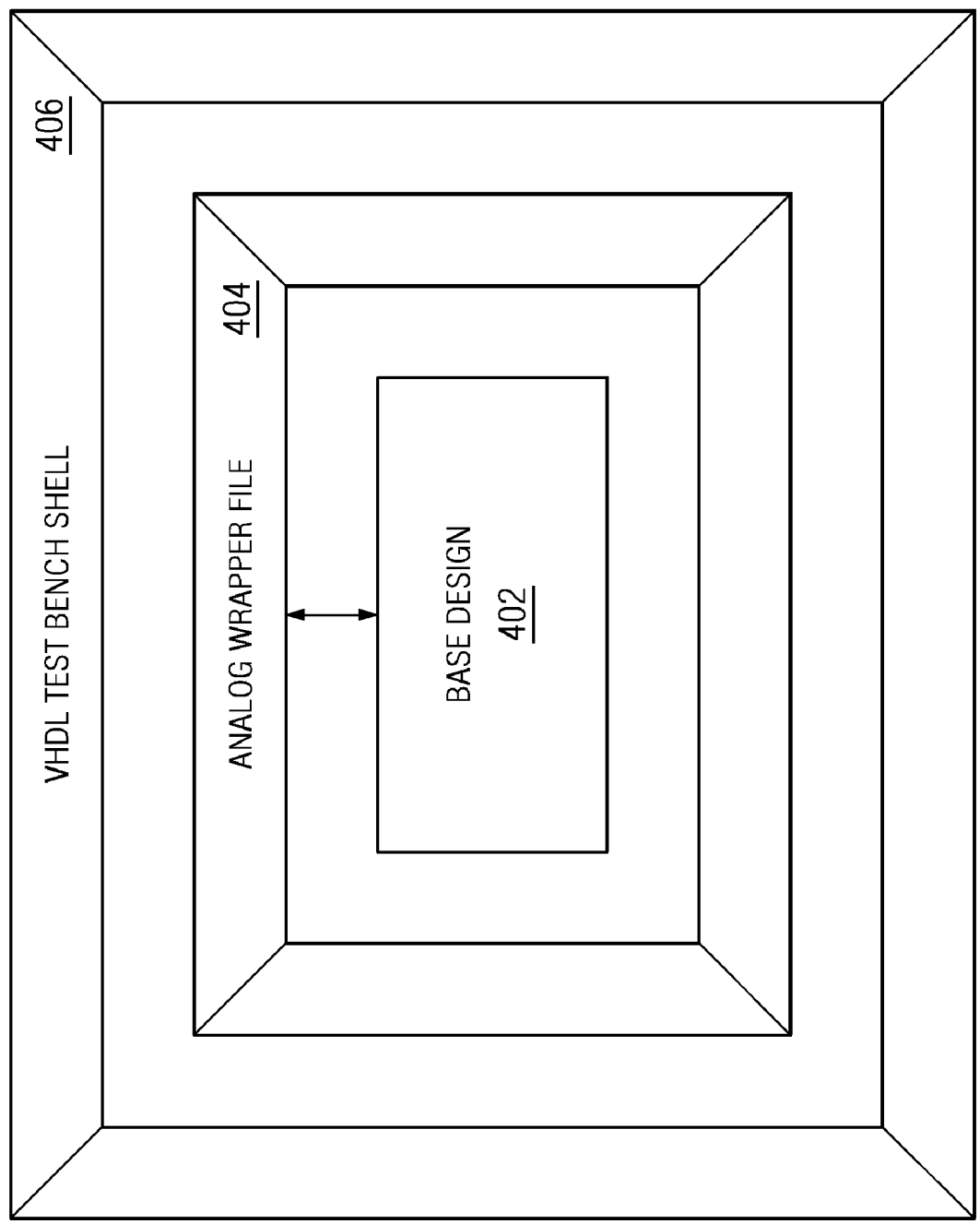
FIG. 4 is a simplified schematic diagram illustrating components of an embodiment of the invention.

Referring to FIG. 4, the concepts described above are depicted graphically. Thus, base design 402 is the design of the electronic component, such as the leaf cell of FIG. 2, which is associated with the test rule being validated. Analog wrapper file 404 contains the transformations described above, in regard to the ports and bias pins. VHDL shell 406 is the component adapted for instantiation in the testbench.

Figure 5:
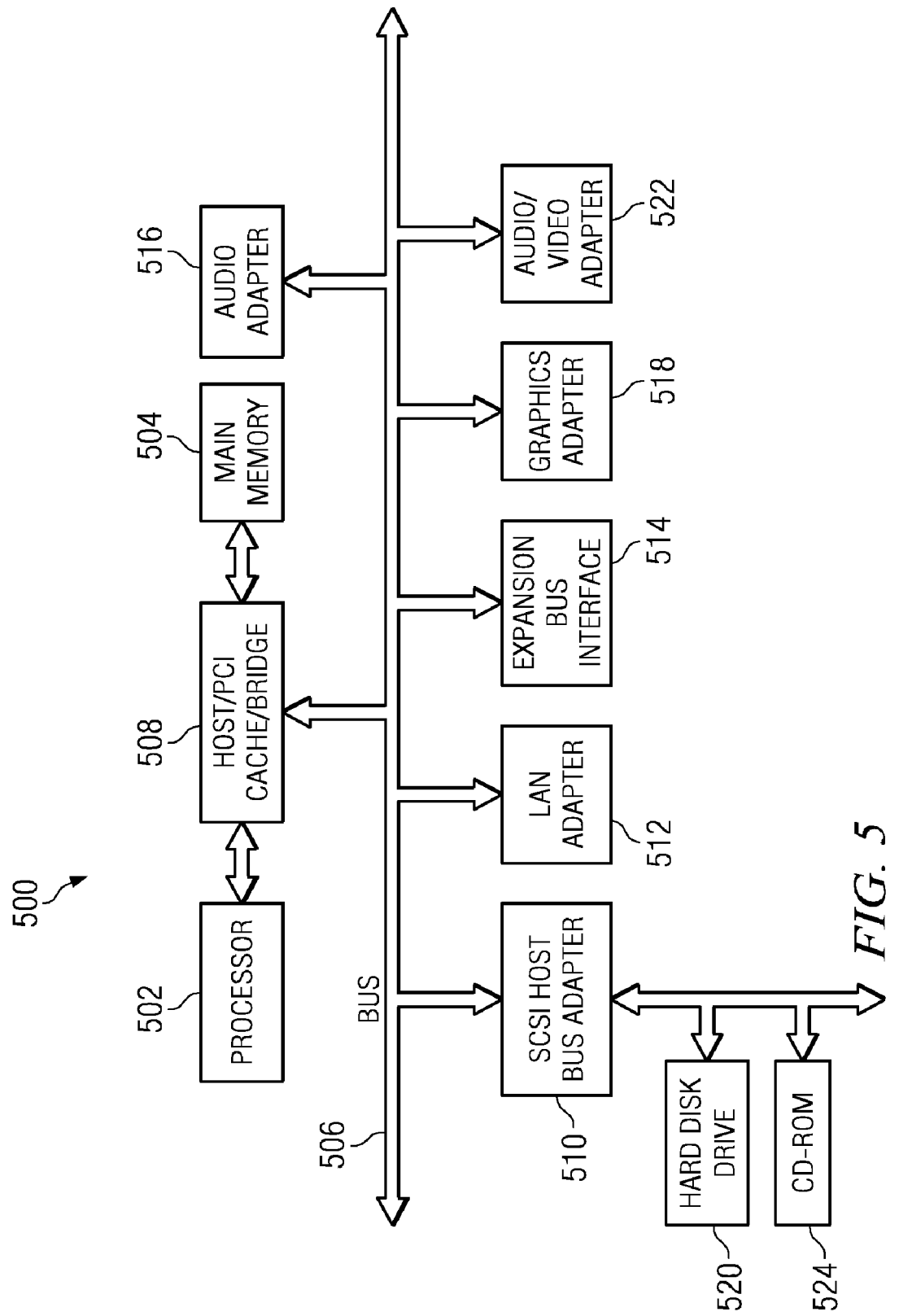
FIG. 5 is a block diagram showing a computer or data processing system which may be used in implementing embodiments of the invention.

Referring to FIG. 5, there is shown a block diagram of a generalized data processing system 500 which may be adapted to implement embodiments of the invention, and to carry out processes such as those described herein. It is to be emphasized, however, that the invention is by no means limited to such systems. For example, embodiments of the invention can also be implemented with a large distributed computer network and a service over the Internet, as may be applicable to distributed systems, LANs and the World Wide Web.

Data processing system 500 exemplifies a computer, in which code or instructions for implementing embodiments of the invention may be located. Data processing system 500 usefully employs a peripheral component interconnect (PCI) local bus architecture, although other bus architectures such as Accelerated Graphics Port (AGP) and Industry Standard Architecture (ISA) may alternatively be used. FIG. 5 shows processor 502 and main memory 504 connected to PCI local bus 506 through Host/PCI Cache bridge 508. PCI bridge 508 also may include an integrated memory controller and cache memory for processor 502. It is thus seen that data processing system 500 is provided with components that may readily be adapted to provide other components for implementing embodiments of the invention as described herein. Referring further to FIG. 5, there is shown local area network (LAN) adapter 512, small computer system interface (SCSI) host bus adapter 510, and expansion bus interface 514 respectively connected to PCI local bus 506 by direct component connection. Audio adapter 516, graphics adapter 518, and audio/video adapter 522 are connected to PCI local bus 506b by means of add-in boards inserted into expansion slots. SCSI host bus adapter 510 provides a connection for hard disk drive 520, and also for CD-ROM drive 524.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain and store the program for use by or in connection with the instruction execution system, apparatus, or device.

The medium can be a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for validating a specified manufacturing test rule pertaining to an electronic component, said method comprising the steps of:
   generating a file of test data sets, wherein each test data set in said file is valid for said rule, and each test data set includes a stimulus that comprises one or more single input vectors, and a set of results that are expected when the stimulus is applied to said electronic component;
   in response to recognizing that said electronic component has at least an analog element or a customized digital logic element, selectively creating a wrapper file to instantiate a base design corresponding to the electronic component and selectively adapting ports disclosed by the base design for simulation;
   constructing a testbench to prepare each of a plurality of testcases for simulation, wherein each testcase corresponds to the stimulus and the expected results of a different one of said test data sets, and each testcase is disposed to be simulated separately from every other testcase;
   selectively preparing each of said testcases for simulation, in order to provide simulated results for the stimulus corresponding to each testcase; and
   comparing the simulated results and the corresponding expected results for each testcase, to determine whether there are any differences therebetween.

2. The method of claim 1, wherein:
two or more of said testcases are selectively simulated simultaneously with one another.

3. The method of claim 1, wherein:
information is produced that indicates, for each testcase, whether or not the simulated results for a testcase match the expected results thereof.

4. The method of claim 2, wherein:
the simulation and comparing tasks for different testcases are carried out by a parallel processing operation.

5. The method of claim 2, wherein:
the simulation and comparing tasks for different testcase are carried out by means of a multiprocessor.

6. The method of claim 1, wherein:
one or more bias pins associated with respective ports are selectively inserted automatically into said wrapper file, and are electronically stimulated by means of a specified source.

7. The method of claim 1, wherein:
a given port selectively operates in a voltage domain subset, and a specified shim is inserted into said wrapper file, to convert selected values of said testbench to respectively correspond to point values of said voltage domain subset.

8. The method of claim 1, wherein:
a given port is selectively characterized by a CML differential output pair, and a specified shim is inserted into said wrapper file, to calculate an equivalent single logical output value and place a full voltage rail difference on the differential CML output pair.

9. The method of claim 1, wherein:
said wrapper file comprises an analog wrapper file.

10. The method of claim 1, wherein:
said testbench comprises a VHDL testbench or a Verilog test bench, selectively.

11. The method of claim 1, wherein:
said file of test data sets is generated by means of an Automatic Test Pattern Generation Tool.

12. A computer program product comprising:
a computer readable storage medium having instructions embodied therewith for validating a specified manufacturing test rule pertaining to an electronic component, the instructions comprising:
instructions for generating a file of test data sets, wherein each test data set in said file is valid for said rule, and each test data set includes a stimulus that comprises one or more single input vector, and a set of results that are expected when the stimulus is applied to said electronic component;
instructions for, responsive to recognizing that said electronic component has at least an analog element or a customized digital logic element, selectively creating a wrapper file to instantiate a base design corresponding to the electronic component and to selectively adapting ports disclosed by the base design for simulation;
instructions for constructing a testbench to prepare each of a plurality of testcases for simulation, wherein each testcase corresponds to the stimulus and the expected results of a different one of said test data sets, and each testcase is disposed to be simulated separately from every other testcase;
instructions for selectively preparing each of said testcases for simulation, in order to provide simulated results for the stimulus corresponding to each testcase; and
instructions for comparing the simulated results and the corresponding expected results for each testcase, to determine whether there are any differences therebetween.

13. The computer program product of claim 12, wherein:
two or more of said testcases are simulated simultaneously with one another.

14. The computer program product of claim 12, wherein:
information is produced that indicates, for each testcase, whether or not the simulated results for a testcase match the expected results thereof.

15. A data processing system for validating a specified manufacturing test rule pertaining to an electronic component, the data processing system comprising:
a bus system;
a communications system connected to the bus system;
a memory connected to the bus system, wherein the memory includes computer usable program code; and
a processing unit connected to the bus system, wherein the processing unit executes the computer usable program code to generate a file of test data sets, wherein each test data set in said file is valid for said rule, and each test data set includes a stimulus that comprises one or more single input vectors, and a set of results that are expected when the stimulus is applied to said electronic component; in response to recognizing that said electronic component has at least an analog element or a customized digital logic element, selectively create a wrapper file to instantiate a base design corresponding to the electronic component and selectively adapt ports disclosed by the base design for simulation; construct a testbench to prepare each of a plurality of testcases for simulation, wherein each testcase corresponds to the stimulus and the expected results of a different one of said test data sets, and each testcase is disposed to be simulated separately from every other testcase;
selectively prepare each of said testcases for simulation, in order to provide simulated results for the stimulus corresponding to each testcase; and
compare the simulated results and the corresponding expected results for each testcase, to determine whether there are any differences therebetween.

16. The data processing system of claim 15, wherein:
two or more of said testcases are simulated simultaneously with one another.

17. The data processing system of claim 15, wherein:
information is produced that indicates, for each testcase, whether or not the simulated results for a testcase match the expected results thereof.

* * * * *